United States Patent [19]

Russo

[11] Patent Number: 4,817,139

[45] Date of Patent: Mar. 28, 1989

[54] ADJUSTABLE TELEPHONE HANDSET CRADLE

[76] Inventor: Angelo Russo, 48 Troy Ave., Latham, N.Y. 12110

[21] Appl. No.: 67,594

[22] Filed: Jun. 29, 1987

[51] Int. Cl.⁴ .................. H04M 1/04; H04M 1/12
[52] U.S. Cl. ............................. 379/449; 379/434; 379/433; 379/447; 379/450; 379/441
[58] Field of Search ............... 379/434, 441, 449, 447, 379/450, 433

[56] References Cited

U.S. PATENT DOCUMENTS 2,493,954  1/1950  Epstein ........................ 379/449
3,056,862 10/1962  Renneker ..................... 379/449
3,567,871  3/1971  Walter ......................... 379/449

Primary Examiner—Jin F. Ng
Assistant Examiner—Wing F. Chan
Attorney, Agent, or Firm—Schmeiser, Morelle & Watts

[57] ABSTRACT

A tiltable and to-fro adjustable telephone handset cradle. A curvilinear wire-or band-frame cradle has a base that engages a track which is fixable to a handset. Pivotability means in the cradle, as well as a slideable, adjustable attachment to the handset, achieves an apparatus that grants considerable comfort to the telephone user by allowing side-to-side head motion and adjustment of head to-fro posture.

7 Claims, 2 Drawing Sheets

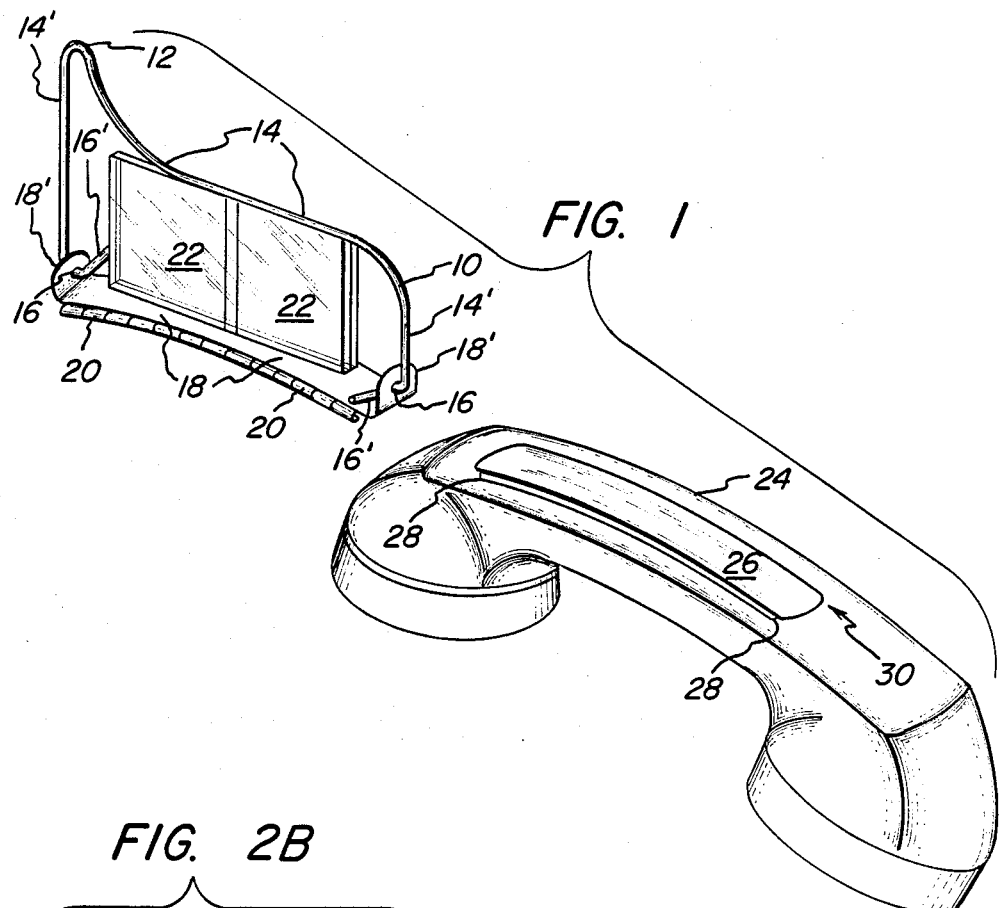
FIG. 1
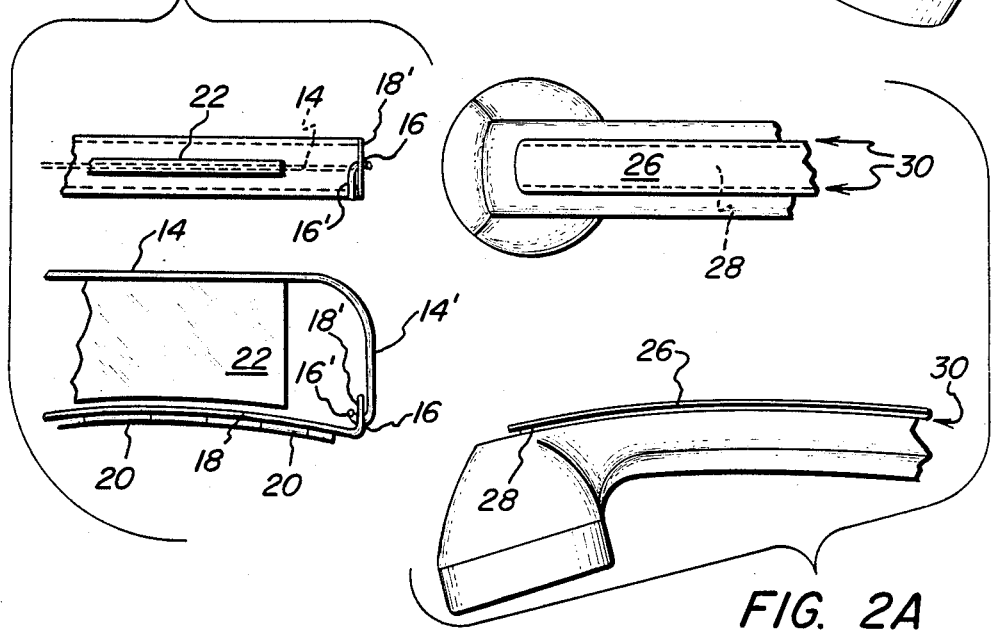
FIG. 2B
FIG. 2A

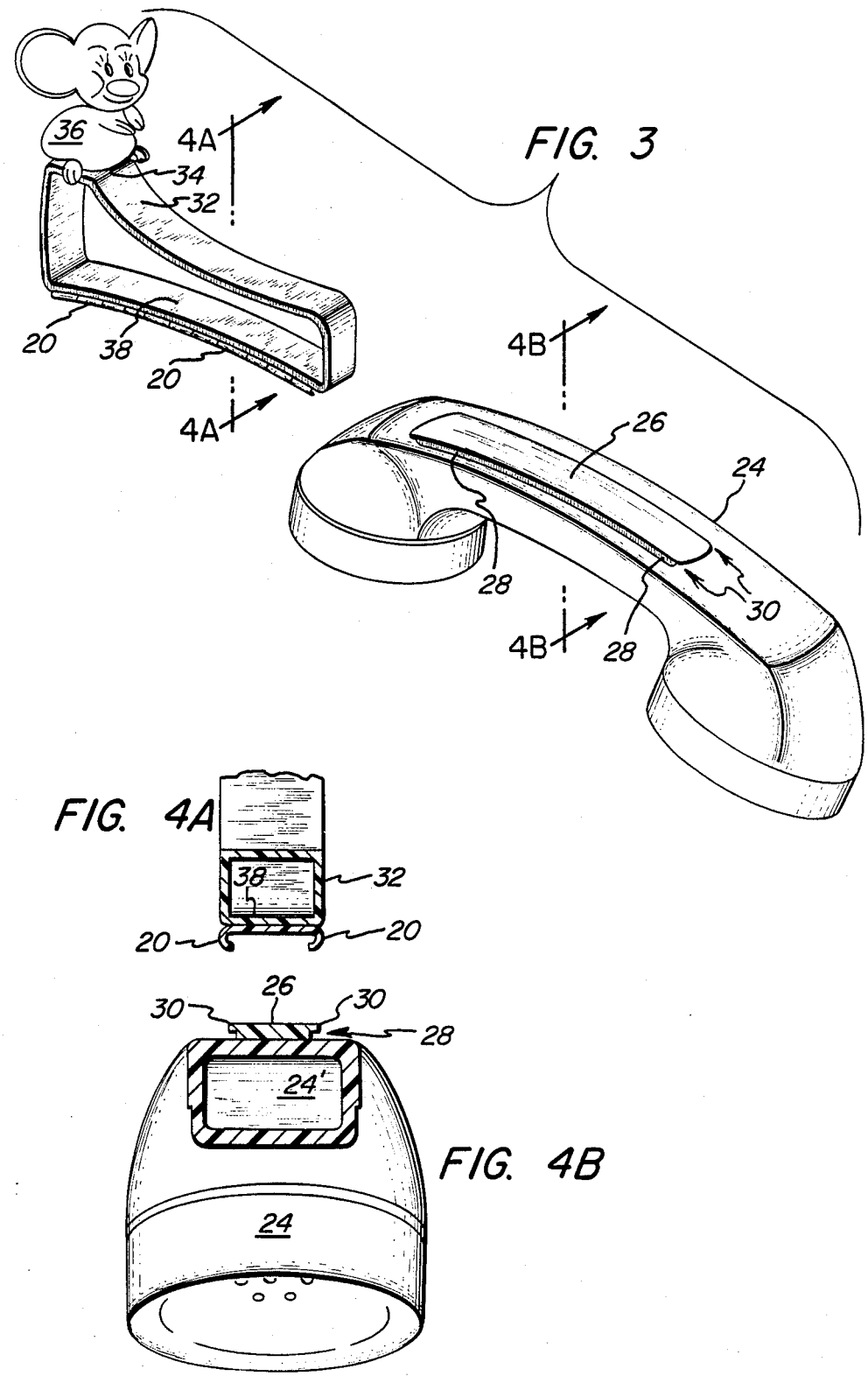

ADJUSTABLE TELEPHONE HANDSET CRADLE

FIELD OF THE INVENTION

The present invention relates generally to telephone handset holders of a type that allow use of the telephone handset without a person gripping it, and more particularly to a handset cradle which holds the telephone handset against the user's ear by snubbing part or all of the handset unit between the user's head and shoulder.

BACKGROUND ART

Since the advent of the modern telephone handset, which contained both listening and speaking apparatus, many devices in the form of handset adjuncts have been attached to the handset so as to allow the user full freedom of his or her hands, while carrying on a telephone conversation. To this end, a relatively modern device is disclosed in U.S. Pat. No. 4,556,762 which issued to Campbell in 1985. This invention conceives of a rigidly affixed (to the handset) curvilinear wire cradle having several pieces. A base piece which conforms to the shoulder of the user is rigidly affixed, by banding means, to the handset. Another piece, also curvilinear is wound about the user's neck and affixed to the main cradle frame through a hook-in-eye arrangement. An alternative embodiment conceives of a more stylized rendering of the cradle base, as well as alternative attachment means. In both embodiments, Campbell retains the main theme of the invention and offers no alternative to the neck-encompassing member. It appears, to one of ordinary skill in the art, that the invention cannot function sans a neck-encompassing element.

Art available prior to U.S. Pat. No. 4,556,762, is exemplified by U.S. Pat. No. 2,493,954, issued to Epstein in 1950. Epstein taught a shoulder conforming base to a cradle that pivotally engaged the handset. The ability of this invention to pivot somewhat, as the handset was cradled and snubbed between the user's shoulder and ear, fullfilled a long standing need in devices of this nature. Notably, and as an exhaustive search of the prior art has revealed, pivotability and latitude for head motion, in addition to shoulder motion, is rarely if ever, contemplated by inventors. It appeared to this inventor that no thought is ever paid to comfort, when developing inventions of this genre.

Recently, a telephone handset cradle that offers a modicum of comfort to the user, was brought to this inventor's attention. A resilient curvilinear attachment trademarked as Softalk, has been recently brought to the market by Practical Innovations, Inc. of Salt Lake City, Utah. This invention is comfortable in that it is soft and resilient. The producer claims that it will fit either shoulder comfortably; as one familiar with the art, the inventor would attribute this to its inherent resilence. It attaches easily by means of a form of adhesive tape that is affixed to the back or handset-receiving side of the invention. The Softalk attachment is extremely useful; but unfortunately suffers from the fact that, like all the prior art, it entertains no adjustability per se. Rather, it relies upon its collapsibility to afford what should be inherent design parameters, namely, adjustability for the tilting of the head from side to side as well as an adjustment for the variability in "nod" i.e., to-fro positioning of the head of any user.

To overcome limitations of the prior art, this inventor chose to depart from the traditional design theme found in this field and systematically provide an apparatus that would allow freedom of motion in the planes defined by head tilt and "nod" postures. All the while, it was necessary to keep in mind that the preferred embodiment must have a high degree of esthetic attraction. To this latter end, there has been provided a feature of the invention that serves a dual purpose—an element that achieves comfortable securement of the invention while it is in use, and which affords an engaging or "cute" appearance when the handset/invention is not in use.

SUMMARY OF THE INVENTION

The disadvantages arising from the usage of prior telephone handset holder/cradles are obviated by providing a curvilinear frame which has a curved top portion cojoined with at least a single base means, to mount a soft resilient figurine thereon, and a curved lower portion that conforms to and is slidably mountable on the handset handle. The bottom, handset-conforming portion of the frame has built-in flanges which are adapted to engage a rigid track-like strip that has been adhesively fixed to the handle of the handset. When the flanged curvilinear frame is slid on to the track-like strip, the entire cradle may be adjusted to any desired postion on the handle. This ability to position along the handle's longitudinal axis affords adjustability in what was earlier described as the to-fro plane ("nod"). With one or more soft, resilient figurines attached to the upper portion or shoulder engaging portion of the frame, a non-slip secure stability is inculcated in the invention.

Optionally, the invention conceives of a pivotal coupling between the shoulder-engaging portion of the frame and the handle-affixing portion. This pivotability is, by design, limited since it would serve no useful purpose to allow anything but a modicum of movement in the tilting plane.

BRIEF DESCRIPTION OF THE DRAWINGS

Of the drawings:

FIG. 1 is an isometric drawing of the invention;

FIGS. 2A and 2B are orthographic illustration of the invention,

FIG. 3 is an isometric drawing of an alternative embodiment of the invention; and FIG. 4A and 4A are longitudinal cross section of the FIG. 3 embodiment.

DETAILED DESCRIPTION OF THE PREFERRED EMBODIMENT

The preferred embodiment of the instant invention comprises a singular attachment (adhesive) means, a base means and two cradle devices, one separate and pivotally mounted, the other integral. The preferred embodiment also conceives of using a firm, yet resilient, figurine at the shoulder-engaging portion of the cradle. The figure serves a dual purpose of providing a secure, non-slipping contact point (or surface) in addition to lending an esthetic and engaging appearance to the invention.

Referring more particularly now to FIG. 1, there is depicted in isometric illustration the two main features of the invention, the cradle 10 and the handset attaching strip 26.

The cradle 10 is comprised of a curvilinear wire 14 having a pronounced peninsular-shaped projection 12 upon which is mounted some firm, yet resilient, mass (not shown) that will afford a frictional, non-slipping surface to the projection 12 portion of the cradle 10. Curvilinear wire 14 is further defined by leg portions 14' which are pivotally mounted at holes 16 in base 18. Preferably, the inventor employs a means for acquiring pivotability and, with a pivotal mounting through base tabs 18' by holes 16, limits the extent of pivotability by recurving wire ends 16' approximately 80-90 degrees off the axes of legs 14'. This opposing recurvature of legs 14' allows cradle 10 to incline approximately ten degrees to the left and ten degrees to the right of the plane defined by the cradle 10 presented orthogonally presented to the base 18. For illustrative purposes, that plane may be visualized by photographic or picture frames 22 which lie congruently in the plane. Frames 22 are provided, either affixed to wire 14 or, alternatively to base 18. The purpose of the frames is to hold visual matter or reading matter for either esthetic purposes or for posting often-used telephone numbers or emergency instructions. It will be further noted, by the reader, that wire ends 16' limit motion in the plane (defined by frames 22) by contact with base 18'. Thus, a desired tilting i.e., the cradle with respect to the base, may be readily adjusted by the user to allow tilting (dynamic) positioning during use.

Referring to base 18 of FIG. 1, there is further depicted a pair of colinear flange, 20 curving under the base. This flange is integral with the base and shall appear in more lucid detail in FIG. 4. It is the purpose of base 18, through flange 20, to engage a flat rectangular, curvilinear track 26 that has been affixed, by suitable adhesive means, to handset handle 24. The inventor uses a contact cement strip 28 for the adhesion means. Like many elements of this invention, the strip 28 has a two-fold purpose, also. Rather than produce a base 18—engaging track, and then place mucilage or adhesive on it, the inventor employs double-sided adhesive tape of a plastic or fibre composition, readily obtainable in most hardware stores. The tape strip 28 is cut narrower than the track 26 so that after fixing one side of it to the track, distinct overlap margins 30 are acquired on the track. When the base 18 flanges 20 are engaged with margins 30 of track 26, the entire cradle 10 may be positioned anywhere along the track. Since it is the purpose of the strip 28 to also adhere to handle 24, it follows that when properly engaged, the handle 24 and track 26, the cradle will be adjustable in the "nod" plane that was described in Background Art of this disclosure.

An orthographic set of illustrations, FIGS. 2A and 2B, more clearly defines the apparatus described above. For the sake of clarity, the upper shoulder-engaging portion of wire 14 is shown in phantom. The recurved ends 16' are clearly depicted from above and the reader can discern the recurve, here orthogonal to legs 14'; but, in conjunction with FIG. 1, clearly opposing. As mentioned earlier, the contact of end 16' with base 18 limits the amount of cradle left-right tilt; while the amount of engagement of base 18 with and along track 26 provides nod, or to-fro, adjustment.

FIG. 3 is an isometric illustration of the invention having all of the esthetics of the FIG. 1 embodiment but lacking tilt adjustability. A wider curvilinear band 32 has replaced the wire and a pedestal 34 takes the place of the projection. In keeping with the invention's esthetic design, figurine 36, composed of a firm, yet resilient-surfaced material is attached firmly to pedestal 34. The figurine's second purpose, comfortable securement, is fulfilled when the cradle is set on the phone user's shoulder. The slight resilience provides enough friction, even with the unclothed shoulder, to retain the band cradle 32 or the wire cradle 10 in the position in which it was placed. In some situations the user may wish to use the tilting device of FIG. 1. Such being the case, he or she has only to slide the band cradle off the handle and slide on, and adjust, the wire cradle. Once adjustments are made, the invention is used in the same fashion as all prior art handset holders are, with the distinction being that the instant invention allows rapid adjustment for individual comfort, selective nod latitude and head side-tilt motion.

A reference to FIGS. 4A and 4B, a cross section of FIG. 3 at 4A and 4B, shows how flanges 20 of band base 38 (or wire base 18) engage track 26 by a gripping action along margins 30. As described above, strip 28 is "sandwiched" between track 26 and handle 24. Strip thickness, as well as breadth, determines the tightness, as well as margin 30 exposure of track 26. It is also noteworthy that the cradle unit of FIGS. 3, 4A and 4B is properly described as unitary. The flanges 20 are lateral band base extensions that have been "bent under" to form the means for gripping track 26 at margins 20.

The aforementioned description and drawings shall serve to teach the principles of this invention. Further applications may be learned from practice with it, limitations thereto being had by the appended claims.

What is claimed is:

1. Apparatus for cradling a telephone handset between the side of the user's head and shoulder comprising:
    a singular curvilinear frame having a curved wire top portion and a flat curved lower portion, said top portion conformable to the shape of a user's shoulder and joined by pivotal means to said lower portion allowing said frame left-right tilt relative to a handset handle, said lower portion comformable to the shape of the handset handle, said lower portion further comprising an essentially flat strip having coextensive tabs with colinear track-gripping flanges; and
    a flat rectangular track adapted for securement by suitable means along the handle of the handset, said track disposed slightly above said handle to provide engagement in slidable registry with said flanges, whereby said track when fixed by said suitable means to said handle is slidably engagable with said flanges and said frame may thereafter be adjusted along said handle and tilt to the particular dynamic nod and tilt motional needs of the user.

2. The invention of claim 1 wherein pivotal means comprises pivotal insertion of both legs of said top portion into and through base tabs of said lower portion orthogonally and oppositely recurved so as to limit the tilt of the top portion of said frame, whereby said frame may be inclined to the plane passing through and coextensive with the longitudinal axis of said handset handle and allow the user the ability to dynamically tilt his or her head while using said apparatus.

3. The invention of claim 1 further comprising base means on said top portion of said frame for mounting at least one figurine thereto.

4. The invention of claim 3 further comprising a firm, resilient surfaced figurine for mounting to said base means.

5. The telephone handset cradle comprising in combination:

a curvilinear cradle body having a wire top portion and base attachment means for attaching said body to the handle of said handset, said body further comprising pivotal means that allows said top portion to dynamically tilt from side to side relative to said base attachment means; and telephone handset engagement means adapted for slidable engagement with said base attachment means to allow slidable and tiltable connection of said cradle to said handset.

6. The invention of claim 5 wherein said base attachment means comprises a flanged track-engaging base.

7. The invention of claim 6 wherein said engagement means comprises a track that is attached to said handset handle.

* * * * *